Patented Oct. 1, 1935

2,016,170

UNITED STATES PATENT OFFICE 2,016,170

PROCESS OF MAKING OIL-GAS

John P. Mallett, Elizabeth, N. J., assignor to Charles M. Dimm, Garden City, N. Y.

No Drawing. Application December 9, 1932, Serial No. 646,492. Renewed April 25, 1935

5 Claims. (Cl. 48—197)

My present invention relates to an improved process of making oil-gas. Heretofore it has been known to make oil-gas by mixing water with a hydrocarbon or mineral oil such as the product known as "gas-oil" and then passing the mixture without admission of air into a hot pipe or passage-way heated to a temperature sufficient to convert the mixture into a fixed gas useable as a fuel or illuminating gas or for enriching water-gas and for other purposes.

My invention is an improvement on the aforesaid general process whereby a gas is obtained having a considerably higher B. t. u. and one which burns with a much hotter flame. Moreover, I accomplish this without any undue increase in cost of manufacture and without complicating the process.

My process produces an oil-gas which is markedly superior to the usual oil-gas; and its B. t. u. and flame temperature may be made so high that when burned in a torch it cuts metal as fast, if not faster, than acetylene and is much faster than ordinary oil-gas. Moreover it is much cheaper to manufacture than acetylene; produces a cleaner job, freer from soot, when used for cutting purposes; and is much safer than acetylene because so much less liable to explode. Of course the gas produced in accordance with my process has many other uses in the arts, such as its use for a fuel gas, an illuminating gas, a gas for enriching water-gas; for welding and brazing, etc.

The invention comprises introducing a carbohydrate such as cane sugar, glucose or starch or other suitable carbohydrate, and an oxidizing agent such as potassium nitrate, sodium nitrate, potassium chlorate or other suitable oxidizing agent into the heated tube or passage-way along with the oil and water. A temperature is used, which may be about 1500° to 2000° F., adapted to produce a fixed gas from the oil and water, enriched with the products resulting from the action of the oxidizing agent upon the carbohydrate. Without the oxidizing agent, the carbohydrate under these conditions breaks up under the action of the heat and while enriching the gas to some extent, soon produces so much carbon deposit as to clog the apparatus. The oxidizing agent by its action on the carbohydrate, very considerably increases the enriching effect without the deposit of free carbon.

The following is a preferred formula for producing a high B. t. u. gas by my process burning with a high temperature flame suitable for use in cutting metals. This preferred formula is as follows, the parts being specified by weight:

| | Parts |
|---|---|
| Gas-oil | 75 |
| Water | 20 |
| Cane sugar | 4.75 |
| Potassium nitrate | .25 |

The sugar and nitre ingredients are preferably dissolved in the water ingredient which is then thoroughly mixed with the oil in any well known or desired manner. The thoroughly incorporated mixture is then admitted in regulated quantity, preferably continuously, into the hot pipe or passage-way from which atmospheric air is excluded, said pipe or passage-way being heated to a temperature at which conversion is brought about into a fixed gas enriched by the products resulting from the interaction of the carbohydrate and the oxidizing agent. The resulting gas is continuously drawn off by suction as usual, and then cooled and compressed for use.

One lot of gas made in accordance with the above formula analyzed as follows:

| | |
|---|---|
| $CO_2$ | 1.3 |
| Paraffins | 23.3 |
| Oxygen | 1.7 |
| CO | 2.8 |
| H | 36.65 |
| $CH_4$ | 31.25 |
| N | 3 |

This gas had 1,050 B. t. u. per pound.

Another lot of gas prepared under strictly comparable conditions, but with the omission of sugar and potassium nitrate developed only 790 B. t. u. per pound.

Cutting tests performed with the two gases on a steel plate 7" wide x ⅜" thick, with the above gases and with acetylene gave the following comparative results in terms of the elapsed time necessary to sever the plate by a transverse cut:—

| | Seconds cutting time |
|---|---|
| Mallett gas | 20 |
| Non-Mallett gas | 25 |
| Acetylene | 28 |

It will be understood that the given example is simply illustrative and is not to be understood as limiting the invention either to the specified ingredients or the stated proportions except as required by the appended claims. Not only may the ingredients be varied within the limits of the invention; but the proportions may also be varied within the limits defined in the claims depending on the B. t. u. desired for the resulting gas and upon the intended use of the resulting gas.

So far as I have been able to discover to date, cane sugar is the best carbohydrate to employ and gives a B. t. u. increase greater than starch which latter ingredient must be used in increased proportion to give a comparable B. t. u.

It will be seen that my improvement in the process of making gas-oil is adapted to produce a superior, high B. t. u. gas at a relatively slight increase in manufacturing cost and without adding any complication to the usual process.

A catalyst may be advantageously used in the hot reaction tube or chamber to promote the chemical reactions between the water and the other ingredients. Thus, there may be used the catalyst disclosed in the copending applications by Herbert L. Rider, Ser. No. 290,869, filed July 6, 1928 and Ser. No. 371,902, filed June 18, 1929, the catalyst there described consisting of titanium spotted on a suitable support. Also other catalysts may be used in connection with the herein process for promoting chemical action, such as nickel in some form. Thus the highly heated parts of the apparatus used for carrying out my herein disclosed process may be constructed of tubing consisting of a chrome nickel steel alloy. By so doing there will be the double advantage first, that such tubing is highly resistant to heat corrosion and secondly, its nickel-chromium ingredient will act as a catalyst to promote chemical action between the ingredients used in the process.

What I claim is:

1. Process of making enriched oil-gas which comprises suitably heating oil, water, a carbohydrate and an oxidizing compound to a temperature adapted to convert same into oil-gas, the oxidizing compound being present in small amount relative to the carbohydrate so as to produce enriching gases without consuming them, and both said oxidizing compound and said carbohydrate ingredients being present in small amount relatively to the oil-water ingredients to the extent of enriching the gas but not to the extent of furnishing sufficient heat for carrying on the process, this being independently furnished.

2. Process of making enriched oil-gas which comprises suitably heating oil, water, a carbohydrate and an oxidizing compound to a temperature adapted to convert same into oil-gas, the weight of the oxidizing compound being only a small fraction of the carbohydrate, and the weight of the carbohydrate being only a small fraction of the oil.

3. Process of making enriched oil-gas which comprises suitably heating oil, water, a carbohydrate and an oxidizing compound to a temperature adapted to convert same into oil-gas, the oxidizing compound being only a fraction of the carbohydrate in weight, and being a still smaller fraction of the oil in weight.

4. Process of making enriched oil-gas which comprises, suitably heating oil, water, sugar and an oxidizing compound to a temperature adapted to convert same into oil-gas, the weight of the oxidizing compound being only a small fraction of the sugar, and the weight of the sugar being only a small fraction of the oil.

5. Process of making enriched oil-gas which comprises, suitably heating oil, water, starch and an oxidizing compound to a temperature adapted to convert same into oil-gas, the weight of the oxidizing compound being only a small fraction of the starch, and the weight of the starch being only a small fraction of the oil.

JOHN P. MALLETT.